United States Patent
Isfort et al.

(10) Patent No.: US 6,932,554 B2
(45) Date of Patent: Aug. 23, 2005

(54) DEVICE FOR CONTROLLING A FORAGER CHUTE

(75) Inventors: Heinrich Isfort, Dülmen (DE); Manfred Poliklas, Rheda-Wiedenbrück (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 46 days.

(21) Appl. No.: 10/650,527

(22) Filed: Aug. 28, 2003

(65) Prior Publication Data

US 2004/0116169 A1 Jun. 17, 2004

(30) Foreign Application Priority Data

Aug. 28, 2002 (DE) .......................................... 102 40 219

(51) Int. Cl.⁷ .................................................. B65F 9/00
(52) U.S. Cl. ........................ 414/397; 198/301; 198/311; 193/16; 56/169
(58) Field of Search ................................. 198/301, 311, 198/315, 317, 318; 193/16; 414/294, 699, 397; 56/169, 185

(56) References Cited

U.S. PATENT DOCUMENTS

| | | | | | |
|---|---|---|---|---|---|
| 4,042,130 | A | * | 8/1977 | Legille et al. | 193/16 |
| 4,368,813 | A | * | 1/1983 | Mailliet | 193/16 |
| 4,575,790 | A | * | 3/1986 | Legille et al. | 193/16 |
| 5,575,316 | A | * | 11/1996 | Pollklas | 414/397 |
| 6,390,268 | B1 | * | 5/2002 | Lonardi | 193/16 |
| 6,578,694 | B2 | * | 6/2003 | Harris et al. | 193/16 |

* cited by examiner

Primary Examiner—James R. Bidwell
(74) Attorney, Agent, or Firm—Husch & Eppenberger, LLC; Robert C. Haldiman (57) ABSTRACT

A control device and corresponding method for controlling a transfer device on a harvesting machine are disclosed. The transfer device is arranged at a distance adjacent to a housing part so as to be rotatable about a vertical axis and, to alter the height setting, elevatable about a horizontal axis. The control device includes a rotation range limiting means that limits the maximum permitted pivot range of the transfer device as a function of the height setting of the transfer device.

14 Claims, 5 Drawing Sheets

DEVICE FOR CONTROLLING A FORAGER CHUTE

CROSS REFERENCE TO RELATED APPLICATION

This application claims priority of German Application DE 102 40 219.1 filed Aug. 28, 2002.

STATEMENT REGARDING FEDERALLY SPONSORED RESEARCH

None

BACKGROUND OF THE INVENTION

The present invention relates generally to harvesting machines and more particularly to a control device for controlling a transfer device on a harvesting machine, wherein the transfer device is arranged so as to be pivotable about a vertical axis and, to alter a height setting, about a horizontal axis.

Self-propelled harvesting machines, for example forage harvesters, combine harvesters, sugar cane harvesting machines and the like, usually have a transfer device, e.g. an upper discharge chute, a grain tank unloading tube, a conveyor chain or a conveyor belt, with which the crop is transferred from the harvesting machine to a transport vehicle. When the harvested crop is to be transferred continuously during a harvesting journey, for example in the case of a forage harvester, the transport vehicle must be driven parallel beside or behind the harvesting machine during the harvesting. For this purpose, the transfer device can be positioned by pivoting about the vertical axis and the horizontal axis in such a way that the discharged or exiting crop stream is deposited in the transport vehicle at the desired location.

By pivoting about the horizontal axis, the height setting of the transfer device is adapted to the height of the transport vehicles and the rising level of crops in the transport vehicle. By pivoting about the vertical axis, the transfer device is brought out of a transport position to a harvesting position. The transport position is provided for road travel, in which the transfer device, directed rearwards, is laid on a transport frame. In the case of harvesting, the transfer device often has to be swung to the right or left when harvesting a section of a field, as the transport vehicle must always travel on the already harvested area of the field section and is therefore located alternately to the right and left beside the harvesting machine. Pivoting of the transfer device about the vertical axis of rotation is furthermore used for uniform filling of the transport vehicle. If the transport vehicle is sufficiently filled at one location, the driver of the harvesting machine can swing the transfer device in such a way that the crop stream impinges on another location within the transport vehicle.

Pivoting about the vertical axis takes place generally by means of a planetary gear by which the transfer device is coupled to the harvesting machine. Unfortunately, continuous pivoting of the transfer device is not possible in most harvesting machines because housing parts of the harvesting machine, for example the driver's cab, protrude upwards above the plane in which the planetary gear is arranged. To prevent a collision with these housing parts, harvesting machines have mechanical stops located on the planetary gear to stop the rotational movement of the transfer device about the vertical axis of rotation before the transfer device can damage the housing part concerned.

This limiting of the pivot range has a particularly adverse effect in forage harvesters in which usually an upper discharge chute is arranged as the transfer device a relatively short distance behind the driver's cab. Owing to this arrangement of the upper discharge chute close behind the driver's cab, the pivot range in such machines is generally not more than 190°. That is to say, the upper discharge chute can essentially be pivoted only within the rear region of the forage harvester. At most it can pivot 10° forward of the perpendicular lateral direction. As a result of this greatly restricted pivot range of the transfer device, monitoring of the transfer device is made difficult for the driver. For monitoring and control of the transfer device, the driver must direct his eyes on the transfer region. On the other hand he must also watch the region of crop pick-up. Therefore, the driver operates the transfer device during parallel travel preferably as close as possible to the rear wall of the cab, i.e. to the front stop. The two monitoring regions that the driver has to watch are close together as a result. Nevertheless, with the current maximum pivot range the distance between the regions is still so great that the driver must constantly turn his head or must use suitably positioned mirrors for monitoring.

The design and arrangement of the upper discharge chute on a forage harvester are predetermined by the optimization of the crop flow within the forage harvester. Hence, these items are not readily variable to extend the pivot range. Similarly, it is not desirable to alter the position of the driver's cab either. Reducing the depth of the driver's cab would impair the driver's comfort. Other drawbacks are associated with this type of alteration.

SUMMARY OF THE INVENTION

It is in view of the above problems that the present invention was developed. The invention is a control device and a method for controlling a transfer device on a harvesting machine. The device and method allow for more comfortable operation and monitoring of the transfer device by the driver. The driver is thereby relieved of stress by the resulting extended possibilities of adjustment during the control and monitoring of the transfer device. Further, due to the larger pivot range, more flexible adaptation of the transfer device to the parallel-driving transport vehicle is possible.

In one aspect of the invention, the permitted pivot range is varied as a function of the current height setting of the transfer device. In this case the pivot range can be adapted so as to avoid the cab housing, which hinders full pivoting. The pivoting range can also be adapted to the shape of the transfer device, and at the same time extended at least as to the given height settings of the transfer device. Consequently, with a suitably selected height setting—within the pivot range limits predetermined at this height setting—the driver can pivot the transfer device further forwards, for example over the roof of a driver's cab as well.

In another aspect of the invention, the control device alters the pivot range in steps. Here, the transfer device is constructed from several segments each connected to each other by horizontal shafts. In this case, to extend the pivot range, separate vertical pivoting of individual segments about the associated horizontal shaft can take place too.

A particularly advantageous embodiment is achieved in conjunction with forage harvesters, because here, first, in spite of the close distance between upper discharge chute and driver's cab, on account of the curved shape of the upper discharge chute at certain height settings considerable extensions of pivot range are possible, and second, it is precisely with these vehicles, which unlike combine harvesters have no temporary storage area for the crop, that transfer to a transport vehicle is always required. But furthermore, the embodiment can also be used advantageously with all other harvesting machines with correspondingly pivotable transfer devices and housing parts extending into the pivot region.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION

Figure 1:
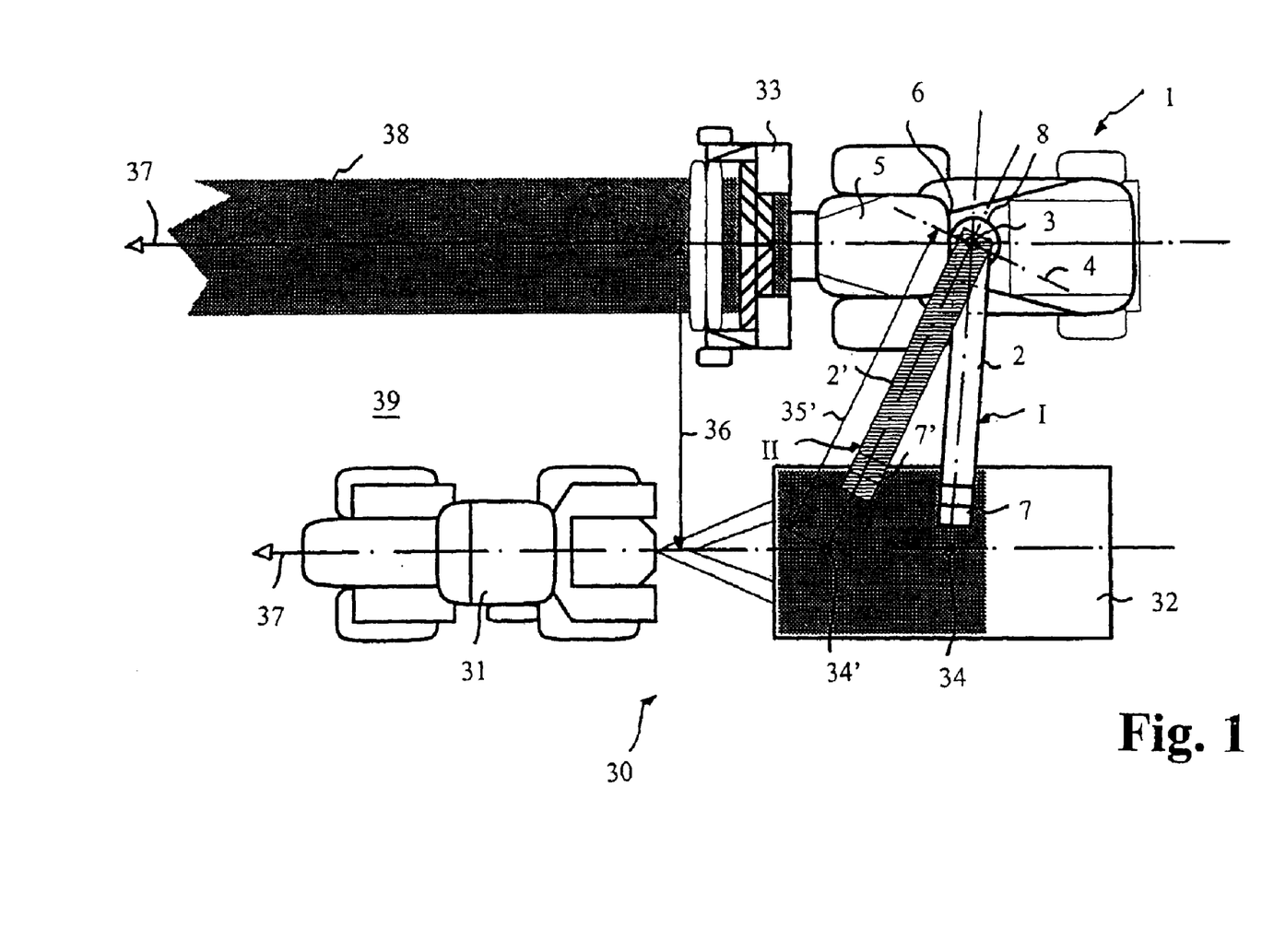
FIG. 1 is a top view of a forage harvester with a parallel-driving transport vehicle during harvesting use.
Figure 2:
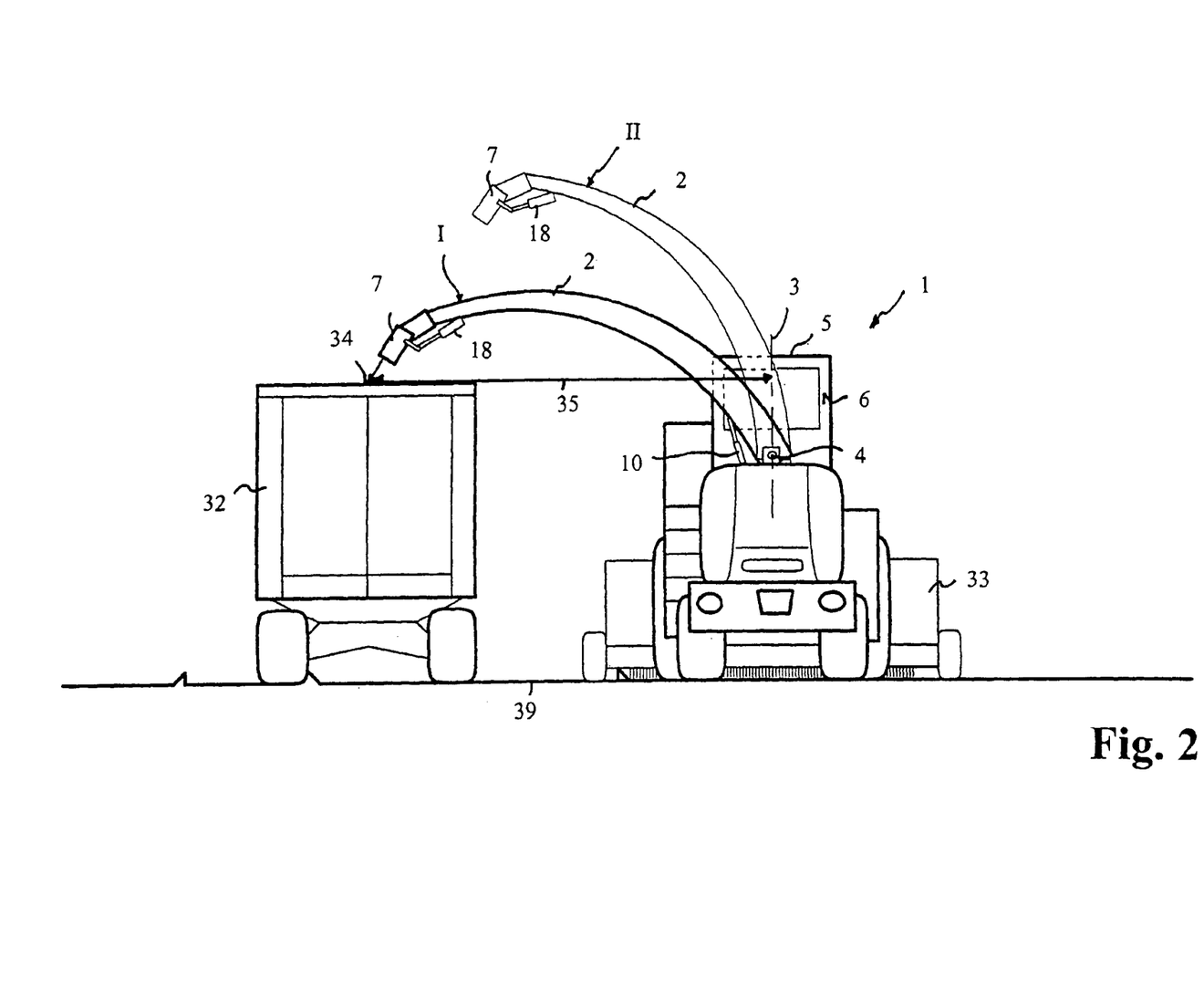
FIG. 2 is a rear view of the forage harvester and transport vehicle as shown in FIG. 1.

In the practical examples shown in FIGS. 1 and 2, a harvesting machine 1 is shown as a forage harvester which collects grass swaths 38 continuously by means of a front pick-up attachment 33. The grass is chopped in the forage harvester 1 and transferred by means of an upper discharge chute 2 to a parallel-driving transport vehicle 30. The transport vehicle 30 here is a tractor 31 which pulls along a transport trailer 32 beside the forage harvester 1. The upper discharge chute 2, also known as a transfer device, is arranged directly behind a housing part 5, such as the driver's cab. The discharge chute 2 is pivotable in the usual manner about a vertical axis of rotation 3 and, to alter a height setting, about a horizontal axis 4.

The upper discharge chute 2 is shown in FIGS. 1 and 2 in two different positions I, II respectively. In the first position I, the upper discharge chute 2 is located at a lower height setting, at which a discharge end of the upper discharge chute 2 is arranged directly over a loading edge of the transport trailer 32. The upper discharge chute 2 in this first position I is pivoted fully forwards towards a rear wall 6 of the driver's cab 5. As FIG. 2 shows, further forward pivoting of the upper discharge chute 2 is not possible at this height setting. With conventional forage harvesters, fixed mechanical stops arranged in the region of the planetary gear usually prevent the upper discharge chute from being pivoted further forwards, regardless of the height setting.

It can be seen from FIG. 1 that the driver of the harvesting machine 1, who must watch the harvesting region ahead in a direction of travel 37 and at the same time the transfer region round a point of discharge 34 of the crop stream in the transport trailer 32, must change constantly between a viewing direction ahead in the direction of travel and a viewing direction obliquely to the rear. This causes an additional strain on the driver. Therefore, the forage harvester 1 has a control device for the upper discharge chute 2, which does not work with fixed pivot range limits. Instead, the pivot range limiting means here is constructed in such a way that the maximum permitted pivot range is determined as a function of the height setting of the upper discharge chute 2.

In the depicted embodiment, the pivot range limiting means is constructed and/or arranged in such a way that, upon pivoting in the direction of the cab housing 5, the transfer device 2 is automatically pivoted higher about at least one horizontal axis—either continuously or in segments—in a vertical direction, beyond the maximum rotational pivot range laid down at a lower height setting of the transfer device 2. That is, the pivot movement of the transfer device 2 is not stopped upon reaching the rotational limit angles of the current maximum pivot range. Instead, pivoting is allowed beyond the pivot range at the lower position, while at the same time the transfer device 2 is pivoted higher in such a way that the pivot range limits applying at any given time at the individual height settings are maintained and a collision with the cab housing 5 is avoided. Therefore, if the driver wants further forward pivoting upon reaching the current rotational range limits, he does not have to deliver another height setting himself manually. The driver only has to predetermine the desired pivot movement about the vertical axis 3 by means of the usual user interface, and the height adjustment required for this pivot movement will be made automatically.

As can be seen clearly in FIG. 2, with the curved shape of the upper discharge chute 2, it is quite possible upon raising the upper discharge chute 2 to rotate the upper discharge chute 2 still further forwards about the vertical axis 3, without the upper discharge chute 2 colliding with the driver's cab 5. Therefore, in this higher position the pivot range can be made correspondingly larger, so that the upper discharge chute 2 can be rotated further forwards into the second position II shown in FIGS. 1 and 2. In this second position II, the point of impingement 34 of the discharged crop stream in the transport trailer 32 is considerably further forwards compared with the first position I of the upper discharge chute 2. The transfer region is thus closer to the harvesting region which the driver must constantly watch. The driver therefore has the option, without turning his head further, of also monitoring the transfer region from the corner of his eye while driving. Constant checking of this region by the driver during the harvesting journey is consequently easier to perform.

In an embodiment which is realized cheaply, the device comprises sensors for determining a height position value which represents the height setting of the transfer device 2. These can be sensors on the transfer device 2, which generate a corresponding signal as a function of the height setting. Similarly, they can be a memory device or a buffer memory for recording and temporarily storing the control commands or corresponding adjusting signals to the adjusting device, which predetermine a given position. Furthermore, the device comprises a user interface for generating a control command for pivoting the transfer device 2 about the vertical axis 3. Finally, the device includes a control unit 26 which, on the basis of the height position value, determines limit values for the associated maximum pivot range and on the basis of the control command and taking into consideration the pivot range limit values determined emits an adjusting signal to an adjusting device for corresponding pivoting of the transfer device 2 about the vertical axis 3. In this case, the control unit 26 forms an "electronic stop" that stops the pivot movement upon reaching the pivot range limit values, i.e. emits no further adjusting signal to the adjusting device for pivoting about the vertical axis 3 and instead signals, for example, to the driver that the pivot range limit has been reached.

In a particularly advantageous variant of this embodiment, the control unit 26 emits a further adjusting signal for moving the transfer device 2 to another height setting with a larger pivot range. The signal is sent to an adjusting device for pivoting the transfer device 2 about the horizontal axis 4. Here, the transfer device 2 is elevated upwards until a height setting with sufficient rotational pivot range is reached or until elevating the transfer device 2 can longer extend the rotational range. Alternatively, the control unit 26 can also, as soon as the pivot angle relative to the vertical axis 3 which is to be delivered according to the control command is fixed, seek a suitable height setting at which the pivot angle concerned lies within the pivot range limit values. This optimum height setting is then delivered directly.

The control unit 26 can be constructed, for example, in the form of software in a computer unit 19. The driver may deliver at any time, irrespective of any automatic controls provided, any setting of the individual adjusting devices, and in particular also to vary a transfer distance 36 as desired. Advantageously, there is the possibility of switching off the control unit 26 or overriding all automatic control functions.

In a preferred embodiment, the transfer device 2 comprises on the output side, i.e. at its end pointing away from the harvesting machine 1, an adjustable discharge flap 7. Such discharge flaps are usually located at the end of the upper discharge chute of the forage harvester. By the position of the discharge flap 7, a discharge distance 35 can be controlled. The discharge distance is defined as the distance between the input end of the upper discharge chute located on the harvesting machine 1 and the point of impingement of the crop stream on the transport vehicle. If the discharge flap 7 is pivoted downwards, then with a constant height setting of the upper discharge chute the discharge distance 35 is shorter than with the discharge flap 7 pivoted upwards.

The device in this case comprises a controller for driving the discharge flap 7, upon pivoting of the transfer device 2 about the vertical and/or horizontal axis, automatically in such a way, depending on a height setting to be delivered and a pivot angle relative to the vertical axis 3 to be delivered, that the transfer distance 36 set before pivoting remains constant. "Transfer distance" here is defined as the distance between the point of impingement of the crop stream lying in a given horizontal plane of impingement, for example the point of impingement within the plane preset by the loading edges of the transport vehicle, and a line running through the vertical axis 3 of rotation of the transfer device 2 in the longitudinal direction, i.e. in the direction of travel of the harvesting machine 1.

This control of the discharge flap 7 ensures that, in spite of a height adjustment and/or pivoting of the transfer device 2 about the vertical axis 3, the point of impingement remains on a line running parallel and adjacent to the harvesting vehicle. This ensures that, upon forward pivoting of the transfer device 2, particularly lifting of the transfer device 2 over the driver's cab, the crop stream does not suddenly discharge to an unwanted point adjacent to the transport vehicle. Consequently, the driver can comfortably achieve forward pivoting by entering a simple pivot command, without at the same time having to precisely control the point of impingement and reset the other parameters, particularly the discharge flap 7 control, in order to convey the crop stream reliably into the accompanying vehicle.

Such a device with automatic tracking of the discharge flap 7 upon pivoting of the transfer device 2 about the vertical and/or horizontal axis so that the transfer distance 36 set before pivoting remains constant, irrespective of pivot range extension also has the advantage of reducing stress on the driver and makes an additional contribution to minimizing harvesting losses.

Figure 3:
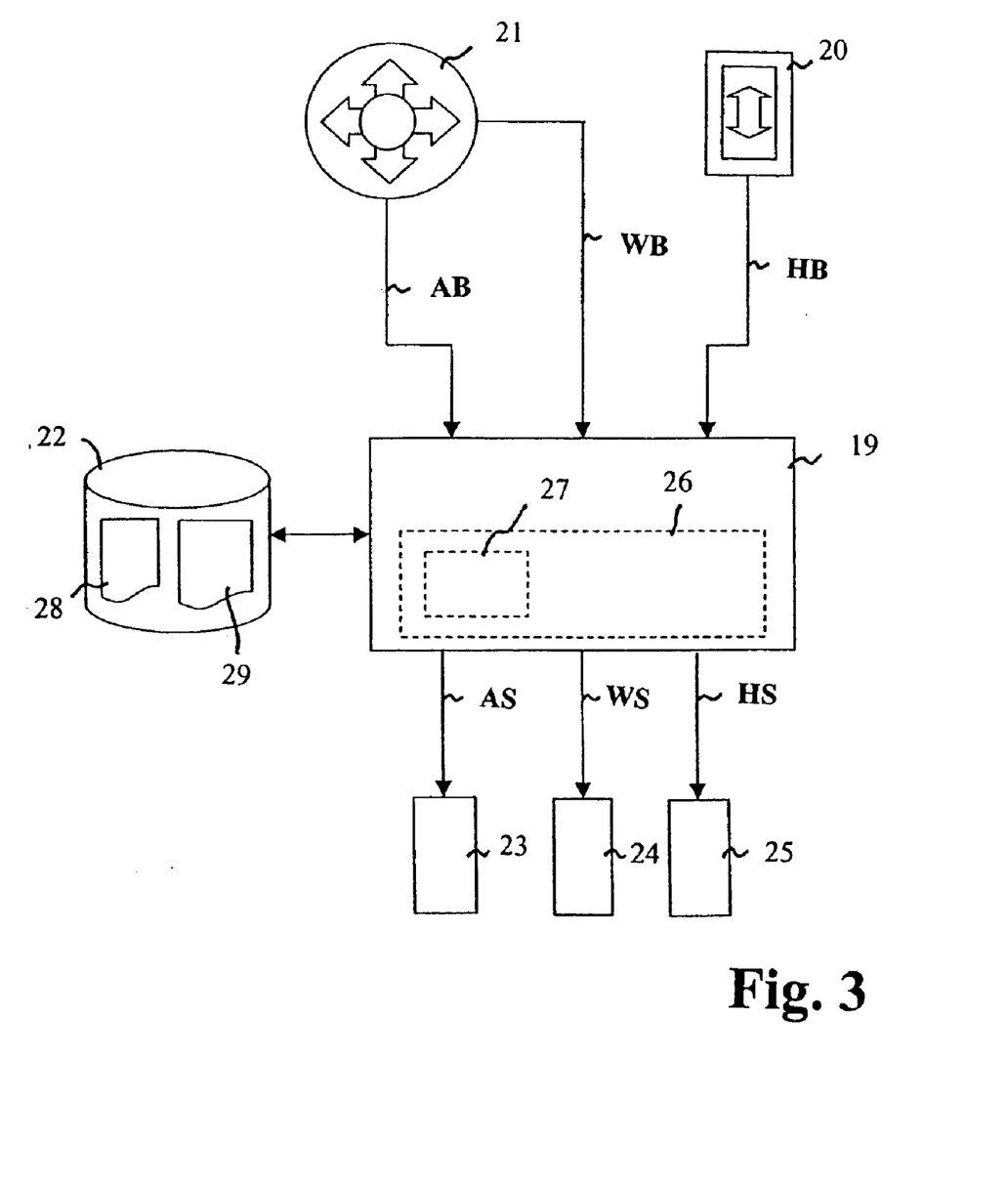
FIG. 3 is a schematic block diagram of the components of an electronically constructed device for the control of an upper discharge chute.

FIG. 3 shows a practical example of an electronically constructed control device of the upper discharge chute 2. A central part of this device is formed by the computer unit 19, for example a microcontroller, which receives control commands AB, WB, HB entered by the user via a user interface for adjusting the height position of the upper discharge chute 2, for pivoting the upper discharge chute 2 about the vertical axis 3 of rotation 3, and for adjusting a discharge flap 7 attached to the upper discharge chute 2 on the output side.

The user interface comprises a rocker button 20 for adjusting the height of the upper discharge chute 2. Depending whether the operator tilts this rocker button 20 up or down, a corresponding height or elevation position control command HB is transmitted to the computer unit 19. Moreover, the user interface includes a multi-direction button 21 which can be tilted in four directions. This multi-direction button 21 can for example be integrated in a multi-function handle, so that the driver can easily operate the multi-direction button 21 with his thumb. Upon tilting to right or left, a corresponding rotational pivot angle control command WB is generated for pivoting the upper discharge chute 2 to the right or to the left about the vertical axis of rotation 3. Upon tilting the multi-direction button 21 up or down, a corresponding discharge flap control command AB is generated, with which the discharge flap 7 is raised or lowered. The arrangement of the directions on the rocker button 20 and multi-direction button 21 are selected such that the driver presses in the right direction intuitively.

A control command AB, WB, HB coming from the user interface is first processed internally in the computer unit 19. The computer unit 19 then emits a corresponding adjusting signal AS, WS, HS to a height position adjusting device 25, a pivot angle adjusting device 24, or to a discharge flap adjusting device 23. In the present case, the height position adjusting device 25 and the discharge flap adjusting device 23 are valves which drive hydraulic cylinders 10, 18 respectively, with which the upper discharge chute 2 is tilted about the horizontal axis 4 or the discharge flap 7 is tilted relative to the upper discharge chute 2. In FIG. 2, the two hydraulic cylinders 10, 18 for adjustment of the height setting of the upper discharge chute 2 and for adjustment of the discharge flap 7 arranged on the upper discharge chute 2 on the output side can easily be seen. The pivot angle adjusting device 24 for pivoting the upper discharge chute 2 about the vertical axis 3 is generally a hydraulic pump which electro-hydraulically delivers an oil quantity to a hydraulic motor which on the output side by means of a worm gear engages in a planetary gear 8 of the upper discharge chute 2 and so pivots the upper discharge chute 2. The pivot direction is here predetermined by the direction of rotation of the hydraulic motor. But instead of the hydraulic motor, a stepping motor or the like can be used, which is driven directly with the appropriate electrical adjusting signals.

It is clear that the adjusting signals AS, WS, HS emanating from the computer unit 19 must if necessary also be adapted to the respective adjusting devices 23, 24, 25, for example converted from a digital to an analog form. The same applies to the control commands AB, WB, HB coming from the user interface, which must likewise be converted from an analog to a digital form for the computer unit 19. The equipment needed for this is not shown here for the sake of clarity. It can be both part of the computer unit 19 and part of the user interface or of the individual adjusting devices 23, 24, 25. It can also be separate units which are each connected between the user interface, the computer unit 19 and the respective adjusting devices 23, 24, 25.

The actual control unit 26 which drives the individual adjusting devices 23, 24, 25 on the basis of the control commands AB, WB, HB given by the user, is implemented in the form of software in the computer unit 19. It is therefore shown in FIG. 3 inside the computer unit 19 in the form of a software module 26 in broken lines. With the aid of the previously entered control commands AB, WB, HB and/or by logging the outgoing adjusting signals AS, WS, HS as well, it is known in the control unit 26 at any time in what is the exact position of the upper discharge chute 2 and the discharge flap 7. The current position data are in this case obtained purely by software and temporarily stored. Alternatively, it is also possible that at the appropriate locations of the upper discharge chute 2 and discharge flap 7 are mounted sensors which record the respective current position, and these sensors are again connected to the computer unit 19 and accordingly deliver position signals to the computer unit 19 (not shown).

For control of the upper discharge chute 2, the control device 26 according to FIG. 3 operates as follows:

With reference to the known height setting of the upper discharge chute 2, first the associated pivot range limit values are established by the control unit 26. This can be done, for example, by reading out a table 28 which is filed in a memory 22 connected to the computer unit 19. In this table 28 are recorded the pivot range limit values for every possible height setting. This table can be searched in any manner by the control unit 26. Thus, not only can the pivot range limit values be established for a given height setting, but it can also be established what height setting must be delivered to achieve given pivot range limit values.

If the driver, by means of the multi-direction button 21, enters a pivot angle control command WB for pivoting the upper discharge chute 2 about the vertical axis 3, with the aid of this control command WB first, it is established by the control unit 26 whether the pivot angle to be delivered by the upper discharge chute 2 is within the pivot range limit values determined for the respective height setting. If so, then a corresponding angle adjusting signal WS is emitted to the pivot angle adjusting device 24. If on the other hand it is established that the pivot angle to be delivered is outside the pivot range limit values which were predetermined at the current height setting, there are two different options.

First, the control unit 26 can, by means of the table 28, search out the closest height setting which has a large enough pivot range. The control unit 26 then emits corresponding pivot angle adjusting signals WS and height position adjusting signals HS to the pivot angle adjusting device 24 and the height position adjusting device 25, so that the pivot angle wanted by the driver is delivered and at the same time the upper discharge chute 2 is pivoted upwards by the necessary distance, so that a collision with the driver's cab 5 is avoided. Alteration of the height setting can be continuous or in stages. In the second option, this function is disabled and a pivot angle adjusting signal WS is emitted to the pivot angle adjusting device 24 only until the upper discharge chute 2 has reached the pivot range limit values provided for the respective height setting. Automatic height adjustment by the control unit 26 does not take place in this mode.

Preferably, it is possible to switch the control unit 26 back and forth between the different modes, so that for example normally automatic adaptation of the height setting is carried out to achieve a desired pivot angle and the driver can deliberately switch off this mode if, for example in unfavorable wind conditions and when the crop, e.g. grass, is dry, to avoid crop losses he would rather keep the upper discharge chute 2 under all circumstances as close as possible above the loading edge of the transport vehicle 30 and in return forgoes an optimum arrangement of the viewing region.

To the computer unit 19 can also be connected further control elements of the user interface as well as further computer components, adjusting devices, display device, etc., for controlling other functions of the harvesting machine 1 and/or switching back and forth between different modes of operation. But these components are not shown in FIG. 3, for the sake of clarity.

In the practical example shown in FIG. 3, the device 26 has an automatic discharge flap control unit 27. The latter ensures that, upon pivoting of the upper discharge chute 2 about the vertical and/or horizontal axis 3, 4, the preset transfer distance 36 between the forage harvester 1 and the point of impingement 34 of the crop stream on the transport vehicle 30 remains constant. This discharge flap control unit 27 is here constructed in the form of a software module 27, for example as a subroutine of the control unit 26, in the computer unit 19. For this, once again reference is made to FIG. 1. In this figure both the discharge distance 35 and the transfer distance 36 are shown graphically. The discharge distance 35 is here defined as the distance from the vertical axis of rotation 3 of the upper discharge chute 2 to the point of impingement 34 of the crop stream within the plane of impingement defined by the height of the loading edges of the transport vehicle 32. The transfer distance 36, on the other hand, is defined as the distance from the point of impingement 34 to the longitudinal axis of the forage harvester 1 which runs through the vertical axis of rotation 3 of the upper discharge chute 2. The transfer distance 36 thus predetermines the distance at which the transport vehicle 32 must drive along parallel beside the forage harvester 1. The point of impingement 34 shown in the figures or the plane of impingement defined here for definition of the point of impingement 34 at the height of the loading edge of the transport trailer 32, is chosen arbitrarily. A point of impingement can equally be defined on a field 39 or on any freely chosen plane. Similarly, the transfer distance 36 can also be defined with respect to any line or position on the forage harvester 1.

The pivot range limiting means can here be constructed and/or arranged in such a way that, with increasing height setting of the transfer device 2, the maximum permitted pivot range is continuously extended. Alternatively, with increasing height setting of the transfer device 2, the maximum permitted pivot range can be extended in stages. Accordingly, automatic lifting of the transfer device 2 while pivoting towards the housing part 5 which limits the pivot range can take place both continuously and in such a way that the pivot movement about the vertical axis 3 is temporarily interrupted, then the transfer device 2 is first automatically lifted to a higher position and then pivoted further about the vertical axis 3, etc.

As is seen from FIG. 1, upon pivoting of the upper discharge chute 2 from the first position I into the second position II, the discharge distance 35 must be considerably lengthened to arrive at the same transfer distance 36. This is partly compensated by automatically pivoting the upper discharge chute 2 higher. Moreover, adaptation of the discharge distance 35 must be done by pivoting the discharge flap 7 at the output end of the upper discharge chute 2.

To carry out this automatic adaptation, in the memory 22 is filed a data field 29 in which the respective transfer distances are recorded as a function of the possible flap positions, the pivot angle positions and the height settings of the upper discharge chute 2. As the control unit 26, as described above, already has at any time the data on the current positions of the upper discharge chute 2 and the discharge flap 7, the current transfer distance 36 can be determined at any time with the aid of the data field 29. Conversely, for a predetermined transfer distance 36 and known variation in the pivot angle position and height setting of the upper discharge chute 2, the appropriate discharge flap position can be determined at any time by means of the data field 29 in order to achieve a predetermined transfer distance 36. The control unit 26 can then ensure output of a corresponding discharge flap adjusting signal AS from the computer unit 19 to the discharge flap adjusting device 23.

The function of this automatic discharge flap control unit 27 too can advantageously be switched off by the driver at any time, so that on request he can vary the transfer distance 36 as desired by lifting the upper discharge chute 2 without this being compensated by counter-control of the discharge flap 7. Moreover, manual override of the discharge flap 7 can be carried out at any time by means of the multi-direction button 21, such manual variation of the position of the discharge flap 7 leading to a new transfer distance 36. The new transfer distance 36 then serves as the basis for subsequent automatic tracking.

Apart from such a purely electronic construction of the invention, it is also possible to construct the device largely mechanically.

The pivot range limiting apparatus depicted includes as a connecting link a guide collar or ring 11, for example with an approach ramp 12, as well as a sensing device 15, cooperating therewith. At least when the transfer device 2 is within a given height setting range, upon rotation of the transfer device 2 about the vertical axis 3 this sensing device 15 travels along the connecting link 11 in sections, i.e. at least in a given section. Due to movement of the sensing device 15 along the connecting link 11, upon pivoting about the vertical axis 3 in the direction of the cab housing 5, within certain pivot ranges the transfer device 2 is automatically also elevated higher about the horizontal axis 4.

This can be effected purely mechanically, for example by mounting on the housing of the harvesting machine 1 in the end regions of the maximum pivot range, e.g. to right and left behind the driver's cab, instead of the known fixed stops, approach ramps over which sensing or pressure elements permanently fixed to the transfer device 2 such as rollers, bolts or the like run and mechanically push the transfer device 2 upwards. The sensing or pressure elements are in this case, for example, arranged at the end of a hydraulic cylinder for horizontal pivoting, which end is normally fixed to the harvesting machine 1.

In the depicted embodiment, the adjusting device usually used for pivoting increases the stability, and in particular avoids swinging of the transfer device 2 about the horizontal axis 4. For this purpose, the sensing device 15 includes a corresponding control element, for example a hydraulic valve or a potentiometer, which is coupled to a sensing element which moves along the connecting link 11.

In a further embodiment, the pivot range limiting means include several mechanical stops and/or limit switches arranged in stages, thereby establishing pivot ranges of different width. The arrangement of these stops and/or limit switches is here selected such that, upon rotating about the vertical axis 3 in the direction of the cab housing 5 concerned, the transfer device 2 moves towards different stops and/or limit switches for each different height setting.

In this variant too, it is possible for the transfer device 2 to be elevated higher automatically upon reaching the rotational range limits. For this purpose, for example, some of the limit switches are wired to an adjusting device for elevating the transfer device 2 about the horizontal axis 4. Upon rotation of the transfer device 2 towards one of the limit switches, the adjusting device for elevation is then triggered by the switching pulse of the limit switch and the transfer device 2 is pivoted upwards by a given amount.

Figure 4:
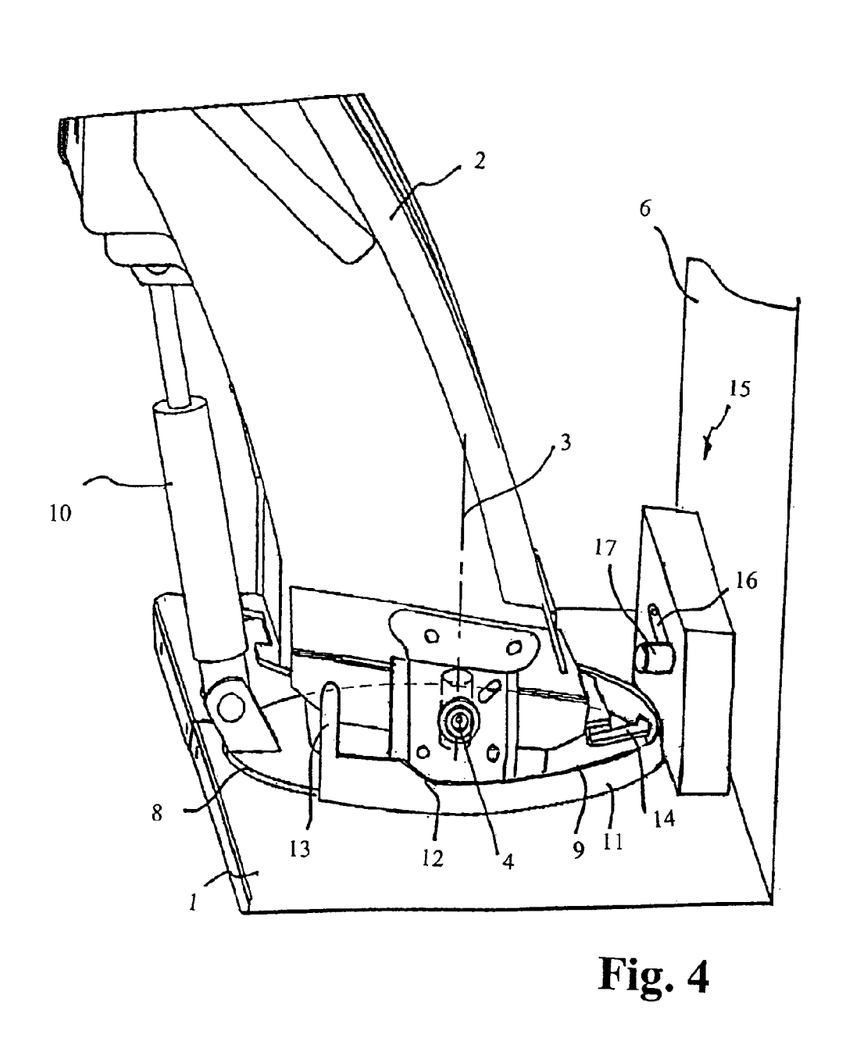
FIG. 4 is a detailed perspective side view of the upper discharge chute of a forage harvester in the region of the planetary gear with an electro-mechanically constructed control device.
Figure 5:
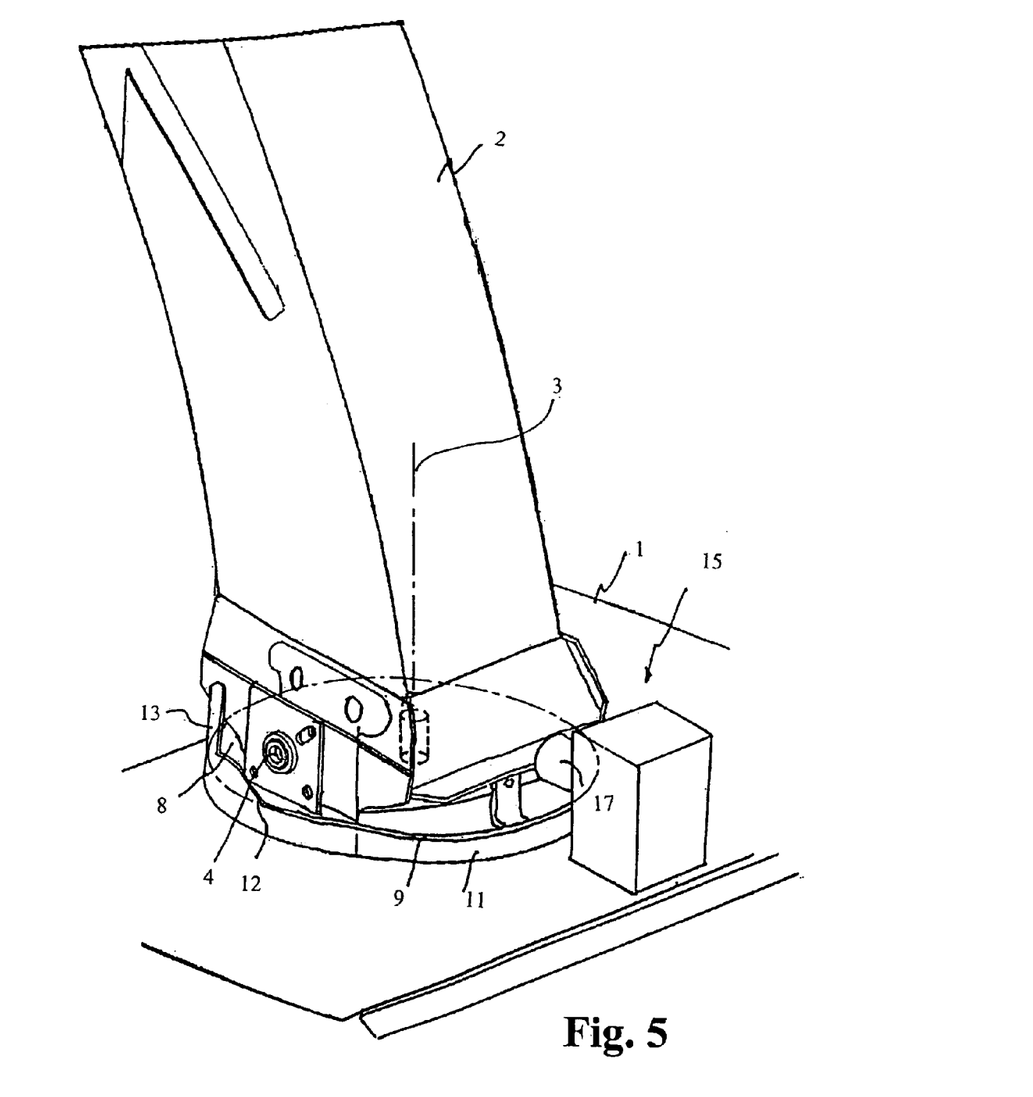
FIG. 5 is a further detailed perspective view of the lower part of the upper discharge chute as in FIG. 4, but seen obliquely from the rear.

FIGS. 4 and 5 show an electro-mechanically constructed alternative providing automatic control of the height setting of the upper discharge chute 2 as a function of the set rotation angle about the vertical axis 3.

For this purpose, at the lower end of the upper discharge chute 2, which is elevatable about the horizontal axis 4, is arranged the connecting link 11 which runs round the planetary gear 8 substantially in a circle. The connecting link 11 is here coupled by connecting webs 14 to the lower end of the upper discharge chute 2 and guided on the planetary gear 8 in such a way that, upon downward de-elevation of the upper discharge chute 2 about the horizontal axis 4, automatically the connecting link 11 is displaced upwards parallel to the planetary gear 8, and upon pivoting of the upper discharge chute 2, the connecting link 11 also rotates about the vertical axis 3. The connecting link 11 includes terminally in each case stops 13 and, in a region at a distance before the stops 13, in each case an approach ramp 12. In the region of the center axis of the forage harvester 1, directly behind the rear wall 6 of the driver's cab, is permanently mounted the sensing device 15 which includes a sensing roller 17 which is connected by a lever 16 to an adjusting shaft of a rotary potentiometer (not visible) here mounted within a housing. Upon rotation of the adjusting shaft, this rotary potentiometer emits an adjusting signal to a hydraulic valve (also not shown), which in turn drives a hydraulic cylinder 10 for elevating the upper discharge chute 2 about the horizontal axis 4. The lever 16 is spring mounted and held in the rest position shown.

The device according to FIGS. 4 and 5 functions in that, upon lowering of the upper discharge chute 2 to a lower position, the connecting link 11 is automatically lifted so far that the sensing roller 17 of the sensing device 15 rolls along over an upper edge 9 of the connecting link 11. If the upper discharge chute 2 then rotates by means of the planetary gear 8 about the vertical axis 3, the sensing roller 17 moves approximately in a position in which the upper discharge chute 2 has reached a perpendicular pivot angle position to the harvesting vehicle 1, towards the approach ramp 12 of the connecting link 11, pushing the sensing roller 17 upwards. Thus, the lever 16 is automatically pivoted upwards against a spring force, so that the adjusting shaft of the rotary potentiometer is rotated accordingly and a suitable signal is emitted, which in turn causes a lifting cylinder 10 to pivot the upper discharge chute 2 correspondingly upwards. This pivoting is effected so far that the sensing roller 17 runs up the approach ramp 12. By pivoting the upper discharge chute 2 higher, the pivot range can thus be extended a considerable amount until finally the sensing roller 17 strikes the stop 13 on the connecting link 11. The sensing device 15 is here constructed in such a way that, when the sensing roller 17 strikes the respective stop 13, a signal is generated which stops pivoting about the vertical axis 3. That is to say, the sensing device 15 has the function of a limit switch at the same time here.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, instead of a rotary potentiometer in the sensing device 15, a hydraulic valve which is controlled by the lever 16 can be directly inserted. Further, a connecting link can also be rigidly attached to the housing of the harvesting machine 1, and a suitable sensing device is attached to the movable part of the upper discharge chute. Similarly, the upper discharge chute can also consist of several segments coupled one behind the other, which are each separately pivotable in height about the horizontal axis connecting the segment concerned to the neighboring segments or the harvesting machine 1. The segments can then be pivoted separately to increase the pivot range at their height setting. Lastly, the widest variations in electronic construction of the invention are conceivable too. In particular, the characteristics of the different electronically and mechanically constructed practical examples can also be combined. Thus, the breadth and scope of the present invention should not be limited by any of the above-described exemplary embodiments, but should be defined only in accordance with the following claims appended hereto and their equivalents.

What is claimed is:

1. A control device for controlling a transfer device on a harvesting machine, the transfer device being pivotable about a vertical axis and about a horizontal axis, the control device comprising:
   a first pivot limit defining a first permitted pivot range of the transfer device about the vertical axis;
   at least one other pivot limit defining a second permitted pivot range of the transfer device about the vertical axis; and
   a sensor operatively engaged with said transfer device, said sensor being configured to signal change from said first pivot limit to said at least one other pivot limit upon a change in elevation of the transfer device.

2. A drive device for adjusting a discharge chute controller for a harvester comprising:
   a rotational position indicator;
   said rotational position indicator indicating the position of a discharge chute relative to the harvester;
   a memory configured to store a first allowed range of rotation in association with a first elevation and to store at least one other allowed range of rotation in association with at least one other elevation;
   a controller adapted to operatively communicate with at least one adjusting drive device for adjusting the discharge chute, said controller being configured to signal that rotation stop at a first limit of amid first allowed range at said first elevation, and said controller being further configured to signal that rotation continue beyond said first limit when the discharge chute is at said at least one other elevation.

3. The discharge chute controller of claim 2 being further adapted to operatively respond to a user-input signal to rotate the discharge chute.

4. The discharge chute controller of claim 2 further adopted to operatively respond to user input signal to elevate the discharge chute.

5. The discharge chute controller of claim 2 being further adapted to automatically adjust elevation to said at least one other elevation in response to a user input signal to rotate the discharge chute beyond said first limit.

6. The discharge chute controller of claim 2 wherein said rotational position indicator is a sensor.

7. The discharge chute controller of claim 2 wherein said rotational position indicator is a second memory, said second memory being configured to log signals to said adjusting drive devices such that said second memory maintains current position data for the discharge chute.

8. The discharge chute controller of claim 2 wherein said memory is a lookup table.

9. The discharge chute controller of claim 2 wherein said elevation and said rotation of the discharge chute are stepped.

10. The discharge chute controller of claim 2 wherein said controller is further configured to signal adjustment of a discharge flap.

11. The discharge chute controller of the previous claim wherein a third memory stores selectable discharge flap positions in association with elevation positions and wherein said controller is configured to signal adjustment of said discharge flap according to said discharge flap positions associated in memory with said elevation positions.

12. A discharge chute for a harvester having elevation controls comprising:
   a guide collar having a first level and at least one ramp;
   a sensor disposed in close cooperation with said guide collar;
   said guide collar being attached to said discharge chute such that rotation of said discharge chute rotates one of said guide collar or said sensor in relation to the other of said guide collar or said sensor;
   said sensor being in operative communication with an elevation driver such that engagement of said sensor activates said elevation driver;
   whereby rotation of said discharge chute to a preconfigured position brings said at least one ramp of said guide collar into engagement of said sensor such that said elevation driver elevates said discharge chute at said preconfigured position.

13. The discharge chute of claim 12 further comprising at least one stop on said guide collar.

14. The discharge chute of claim 12 further comprising a rotation driver in operative communication with said sensor, wherein engagement of said sensor stop's said rotation driver from further rotating said discharge chute.

* * * * *